June 5, 1956 W. E. R. PULMAN 2,748,451
GEAR TRANSMISSIONS

Filed May 5, 1952 3 Sheets-Sheet 1

Inventor·
William Elias Reginald Pulman
his attorneys

June 5, 1956

W. E. R. PULMAN 2,748,451

GEAR TRANSMISSIONS

Filed May 5, 1952

Inventor
William Elias Reginald Pulman

United States Patent Office 2,748,451
Patented June 5, 1956

2,748,451

GEAR TRANSMISSIONS

William Elias Reginald Pulman, Hove, England, assignor to C. V. A. Jigs, Moulds & Tools Limited, Hove, England, a British company Application May 5, 1952, Serial No. 286,053

2 Claims. (Cl. 29—46)

This invention relates to gear transmissions particularly for use in indexing for turrets of automatic machine tools.

According to this invention a gear transmission comprises a pinion, a helical gear wheel in mesh therewith, transversely arranged spindles carrying respectively said pinion and helical gear wheel, bearings for said spindles in fixed relationship with one another, a second pinion having straight parallel and axially extending teeth in engagement with said helical gear, a third spindle carrying said second pinion and arranged transversely to the spindle of the first said pinion, a bearing for the second spindle which latter bearing and the first said bearings are relatively movable in a direction along the teeth of the second pinion.

Preferably the first said pinion also has straight parallel axially extending teeth.

An indexing mechanism according to the invention for a turret for an automatic machine tool comprises a slide carrying the turret, a pinion and a helical gear in mesh with one another and carried by transversely extending spindles mounted in bearings fixed to said slide, the spindle carrying the pinion being in driving relationship with the turret, a second pinion having parallel axially extending teeth secured to a spindle mounted in a bearing on a fixed part of the frame of the machine tool, which spindle is transversely arranged to the spindle carrying the first said pinion and means for establishing a step by step drive to the second pinion at required time intervals. The first said pinion is preferably provided with parallel axially extending teeth which engage the aforesaid helical teeth.

The axial length of the teeth on the second pinion are sufficient to enable the helical gear to slide along them for a distance corresponding to the maximum distance required for the movement of the turret slide.

The invention is particularly applicable to indexing mechanism for a turret such as described in the specifications of prior patent applications Nos. 288,588 and 286,054.

In these cases the aforesaid second pinion is fixed to an intermediate shaft which has also secured to it a Geneva wheel driven by a dog on a carrier clutchable to a continuously rotating shaft by means of a one revolution clutch, means being provided to engage the clutch at predetermined time intervals during a cycle of operations of the machine. With the above arrangement the spindle mounted on the turret slide and arranged in driving relationship with the turret may be at right angles to the intermediate shaft and can be traversed bodily parallel with that shaft.

By these means the minimum number of working parts can be mounted on the turret slide thus considerably reducing the inertia forces.

The following is a description of the gear transmission according to the invention as applied to the indexing mechanism of an automatic turret lathe of the kind described in specifications of patent applications Nos. 288,588 and 286,054, reference being made to the accompanying drawings in which.

Figure 1:
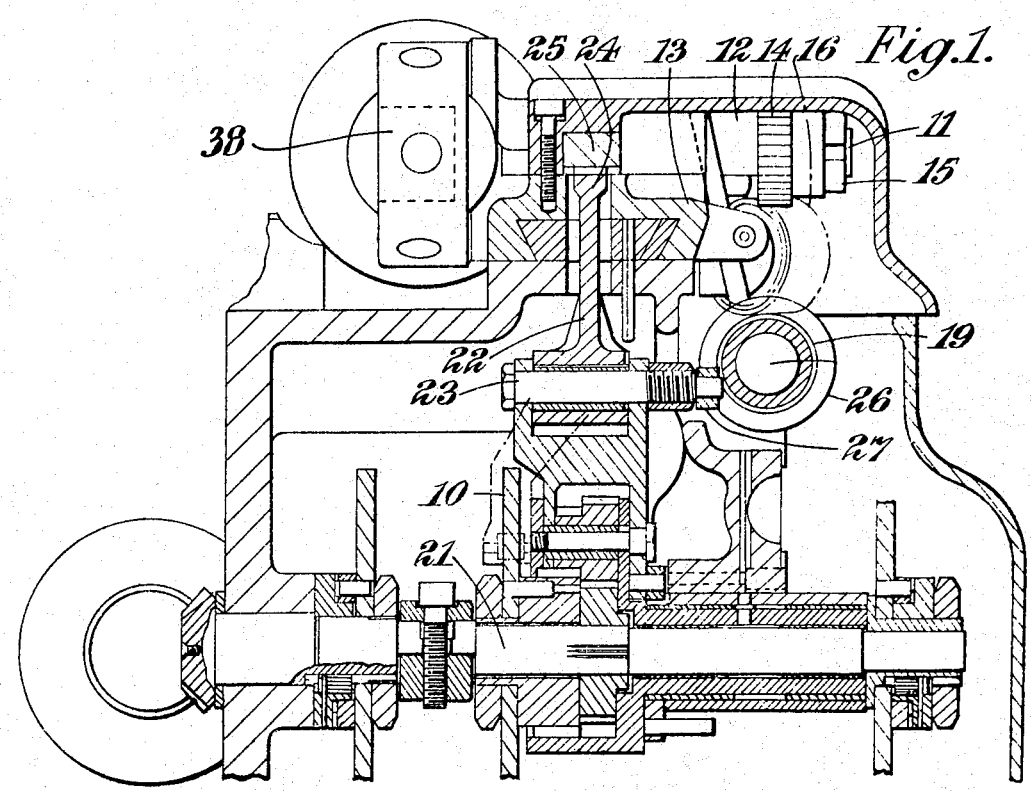
Figure 1 is a cross-section through a part of the lathe showing the gearing associated with the turret spindle and also showing the cross shaft from which the turret slide is operated.
Figure 2:
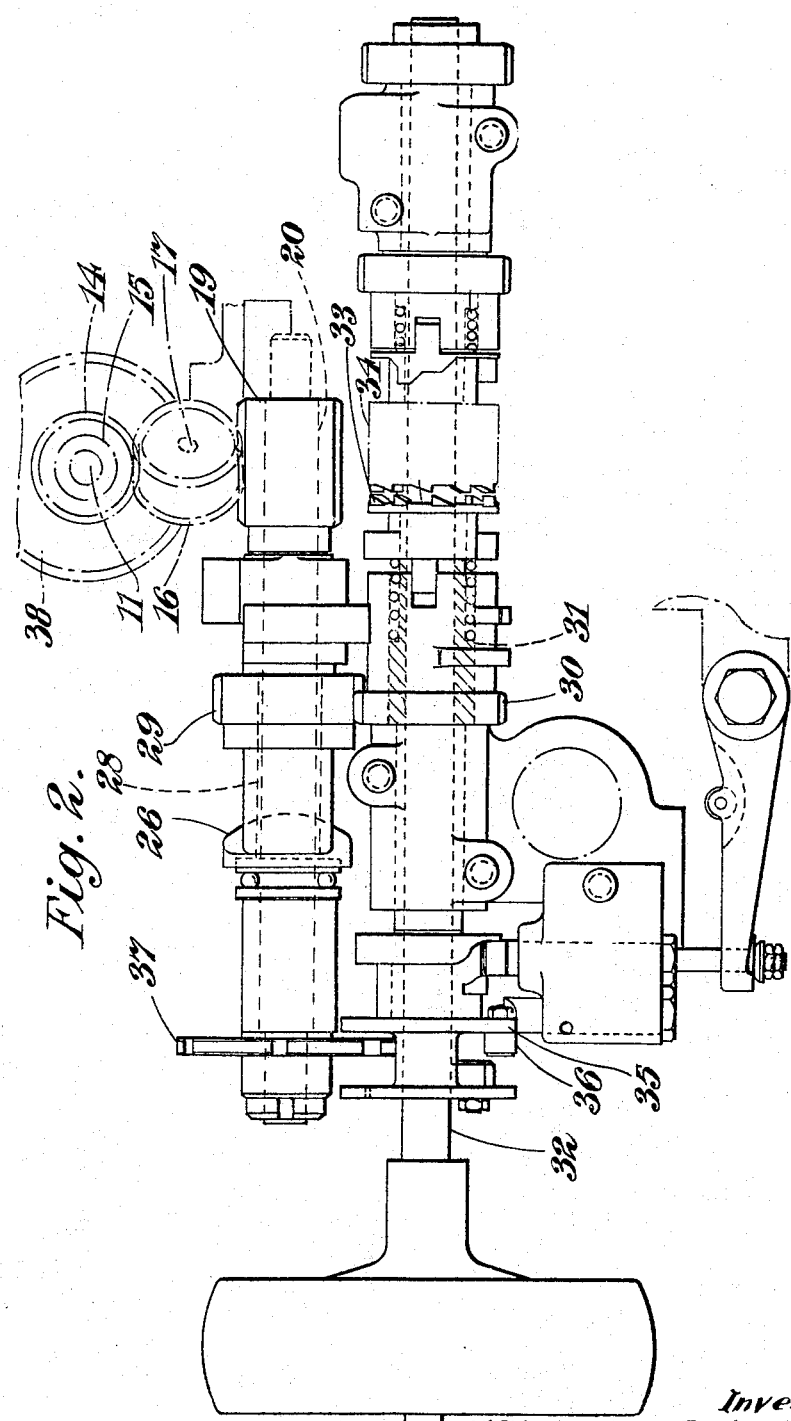
Figure 2 is a side elevation of a part of the lathe showing the back shaft from which the drive of the indexing mechanism is derived and the intermediate shafts which carries one of the pinions of the gearing.
Figure 3:
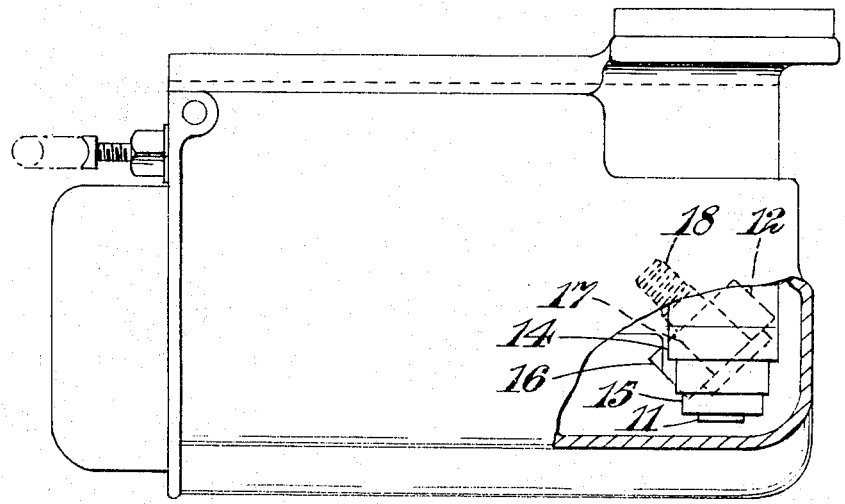
Figure 3 is a plan view of the gearing.

Referring to Figures 1 and 3 of the turret spindle 11 of the turret 38 is mounted in a bearing 12 fixed to the turret slide 13. Keyed to the spindle is a pinion 14 which is held in position by a nut 15 engaging a threaded extremity of the spindle. The pinion 14 is formed with straight teeth extending along the spindle. The pinion 14 engages a helical or skew gear wheel 16 which is rotatably mounted on a pin 17 (Figure 3) which is in threaded engagement at 18 with a part of the turret slide and is so disposed that its axis extends at 45° to the axis of the spindle 11. The teeth on the skew gear wheel 16 have a helix angle of 45° so that they may correctly engage the straight parallel teeth of the pinion 14. As best seen in Figure 2 the skew gear wheel 16 also engages a second pinion 19 fixed to an intermediate shaft 20 the axis of which shaft is at 45° to that of the skew gear wheel 16 and at right angles to that of the turret spindle 11. The teeth of the second pinion 19 are straight and parallel and extend along the intermediate shaft. The turret slide 13 is arranged to move in a direction along the intermediate shaft and thus the teeth of the skew gear wheel 16 will slide along the teeth of the second pinion 19 which are made sufficiently long for that purpose.

The movement of the turret slide is under the joint control of two cams (as described in specification of patent application No. 288,588) one cam 10 (Figure 1) is fixed to the cross shaft 21 which engages a follower (not shown), on a lever arm 22 pivoted on a pin at 23. The lever arm is provided at its extremity with a toothed segment 24 which engages a toothed rack 25 fixed to the turret slide. The second cam 26 engages a roller 27 on the pivot pin 23 which cam is fixed to a sleeve 28 rotated on the intermediate shaft 20 (Figure 2). The sleeve has fixed to it a pinion 29 which engages a pinion 30 fixed to a sleeve 31 encircling a continuously rotating back shaft 32. The sleeve 31 may be clutched to the back shaft by a one revolution clutch 33, 34 which clutch is controlled in a manner described in specification of patent application No. 288,588. The sleeve 31 has also fixed to it a dog carrier 35 having a dog 36 which may engage a slot in a Geneva wheel 37 fixed to the intermediate shaft 20. Thus, when the sleeve 31 is clutched to the continuously rotating back shaft 32, the dog carrier 35 will rotate and by means of the dog 36 will cause the Geneva wheel 37, and thereby the shaft 20, to rotate. Rotation of the shaft 20 is transmitted through gearing 14, 16, 19 to index the turret 38. Movements of the lever arm 22 are transmitted through the toothed segment 24 and the toothed rack 25 to impart reciprocating movement to the turret slide 13. Owing to the gearing 14, 16, 19 reciprocation of the turret slide is possible whilst maintaining the accurate relationship which is necessary between the Geneva wheel and the turret.

I claim:

1. A gear transmission for transmitting a rotary drive between driving and driven elements which are relatively movable along the axis of rotation of the driving element, which transmission comprises a first spindle, a first pinion affixed thereto, a second spindle transverse to the first spindle, a helical gear wheel on the second spindle in mesh with the first pinion, bearings for said first spindle and second spindle fixed to a first mounting, a third spindle, a second pinion fixed thereto, which second pinion is provided with parallel axially extending teeth engageable with the helical gear, a bearing for the third spindle fixed to a second mounting, guide means associated with the two mountings permitting relative movement between the first and third spindles along the axis of the third spindle and means for imparting said relative movement.

2. A gear transmission according to claim 1 wherein the first said pinion also has straight parallel axially extending teeth.

References Cited in the file of this patent

UNITED STATES PATENTS

| | | |
|---|---|---|
| 635,887 | Hartness | Oct. 31, 1899 |
| 2,291,382 | Duglin | July 28, 1942 |

FOREIGN PATENTS

| | | |
|---|---|---|
| 700,080 | Germany | Jan. 9, 1941 |